US006058290A

United States Patent [19]
Katagiri

[11] Patent Number: 6,058,290
[45] Date of Patent: May 2, 2000

[54] PAGING RECEIVER WITH SELECTIVE ERASURE OF STORED RECEIVED MESSAGES

[75] Inventor: Atsushi Katagiri, Yokohama, Japan

[73] Assignee: Matsushita Electric Industrial Co., Ltd., Osaka, Japan

[21] Appl. No.: 08/865,970

[22] Filed: May 30, 1997

[30] Foreign Application Priority Data

Jul. 29, 1996 [JP] Japan .................................... 8-199164

[51] Int. Cl.[7] .................................................... H04B 7/00

[52] U.S. Cl. ..................... 455/38.4; 455/186.1; 455/575; 340/825.44

[58] Field of Search .............................. 455/186.1, 186.2, 455/343, 566, 575, 38.4; 340/825.44

[56] References Cited

U.S. PATENT DOCUMENTS

| | | | |
|---|---|---|---|
| 5,349,696 | 9/1994 | Matai | 340/825.44 |
| 5,365,226 | 11/1994 | Morishima | 340/825.44 |
| 5,418,528 | 5/1995 | Hosack et al. | 340/825.44 |
| 5,430,892 | 7/1995 | Montegi | 340/825.44 |
| 5,493,284 | 2/1996 | Kondo | 340/825.44 |
| 5,535,427 | 7/1996 | Miyashita et al. | 340/825.44 |

FOREIGN PATENT DOCUMENTS

| | | |
|---|---|---|
| 4288733 | 10/1992 | Japan . |
| 7143536 | 6/1995 | Japan . |

*Primary Examiner*—Daniel S. Hunter
*Assistant Examiner*—Thuan T. Nguyen
*Attorney, Agent, or Firm*—Pollock, Vande Sande & Amernick

[57] ABSTRACT

A selective call receiver includes a memory for storing data pieces. A data piece among the data pieces in the memory is designated as an object to be exposed to pseudo erasion. A predetermined signal is added to the designated data piece. The designated data piece with the predetermined signal is inhibited from being read out from the memory. A data piece without the predetermined signal is allowed to be read out from the memory. The predetermined signal is deleted from the designated data piece in response to a requirement for cancel of pseudo erasion. The designated data piece with the predetermined signal in the memory is erased in response to a requirement for actual erasion.

2 Claims, 15 Drawing Sheets

PAGING RECEIVER WITH SELECTIVE ERASURE OF STORED RECEIVED MESSAGES

BACKGROUND OF THE INVENTION

1. Field of the Invention

This invention relates to a selective call receiver such as a message receiver or a paging receiver.

2. Description of the Prior Art

In a typical radio paging communication network, different identification (ID) signals are assigned to paging receivers (selective call receivers) respectively. Any one of the paging receivers can be called by using an ID signal assigned thereto. Generally, a signal representing a message is transmitted to the called paging receiver, and the message is indicated on a display of the paging receiver.

Such a paging receiver (a selective call receiver) includes a memory which can store a plurality of received signals representing respective messages. When a user inputs a message-indicating command into the paging receiver, the message-representing signals are fed from the memory to a display and the messages are indicated on the display.

Japanese published unexamined patent application 7-143536 discloses a selective call signal receiver designed to prevent a message from being erroneously erased by a user. In the receiver of Japanese application 7-143536, the notice of erasure remains indicated for a fixed time before the stored message is actually erased. Specifically, the receiver of Japanese application 7-143536 includes a storage portion which can store received messages. The user can erase any messages from the storage portion by manipulating an operation portion. When a given button on the operation portion is pressed for an instant, the currently-displayed message is prevented from being erased. In the case where the given button is continuously pressed for about one second, the currently-displayed message is replaced by the blinking indication of "DELETE" to previously notify the erasure of the message.

Japanese published unexamined patent application 4-288733 discloses a selective call receiver including a message-erasure inhibiting means. The message-erasure inhibiting means is formed by a control circuit. In the receiver of Japanese application 4-288733, received messages are stored in a memory while being made into correspondence with related ID numbers respectively. The control circuit inhibits a stored message, which corresponds to predetermined one of the ID numbers, from being erased. On the other hand, stored messages corresponding to the other ID numbers can be erased.

SUMMARY OF THE INVENTION

It is an object of this invention to provide an improved selective call receiver.

A first aspect of this invention provides a selective call receiver comprising a memory for storing data pieces; first means for designating a data piece among the data pieces in the memory as an object to be exposed to pseudo erasure; second means for adding a predetermined signal to the data piece designated by the first means; third means for inhibiting the designated data piece with the predetermined signal from being read out from the memory; fourth means for allowing a data piece without the predetermined signal to be read out from the memory; fifth means for deleting the predetermined signal from the designated data piece in response to a requirement for cancel of pseudo erasure; and sixth means for erasing the designated data piece with the predetermined signal in the memory in response to a requirement for actual erasure.

A second aspect of this invention provides a selective call receiver comprising a first memory for storing data pieces; a second memory; a display; first means for designating a data piece among the data pieces in the first memory as an object to be exposed to pseudo erasure; second means for removing the data piece designated by the first means from the first memory to the second memory; third means for inhibiting the designated data piece from being fed from the second memory to the display, and from being indicated on the display; fourth means for allowing the data pieces to be fed from the first memory to the display, and to be indicated on the display; fifth means for returning the designated data piece from the second memory to the first memory in response to a requirement for cancel of pseudo erasure; and sixth means for erasing the designated data piece in the second memory in response to a requirement for actual erasure.

A third aspect of this invention provides a selective call receiver comprising a memory for storing data pieces; first means for designating a data piece among the data pieces in the memory as an object to be exposed to pseudo erasure; and second means for adding a predetermined signal to the data piece designated by the first means.

A fourth aspect of this invention is based on the third aspect thereof, and provides a selective call receiver further comprising third means for inhibiting the designated data piece with the predetermined signal from being read out from the memory, and fourth means for allowing a data piece without the predetermined signal to be read out from the memory.

A fifth aspect of this invention is based on the fourth aspect thereof, and provides a selective call receiver further comprising fifth means for deleting the predetermined signal from the designated data piece in response to a requirement for cancel of pseudo erasure.

A sixth aspect of this invention is based on the fourth aspect thereof, and provides a selective call receiver further comprising fifth means for erasing the designated data piece with the predetermined signal in the memory in response to a requirement for actual erasure.

A seventh aspect of this invention is based on the fourth aspect thereof, and provides a selective call receiver further comprising fifth means for erasing the designated data piece with the predetermined signal in the memory when a predetermined interval of time elapses since a moment of adding the predetermined signal to the designated data piece.

An eighth aspect of this invention provides a selective call receiver comprising a first memory for storing data pieces; a second memory; first means for designating a data piece among the data pieces in the first memory as an object to be exposed to pseudo erasure; and second means for removing the data piece designated by the first means from the first memory to the second memory.

A ninth aspect of this invention is based on the eighth aspect thereof, and provides a selective call receiver further comprising a display; third means for inhibiting the designated data piece from being fed from the second memory to the display, and from being indicated on the display; and fourth means for allowing the data pieces to be fed from the first memory to the display, and to be indicated on the display.

A tenth aspect of this invention is based on the ninth aspect thereof, and provides a selective call receiver further comprising fifth means for returning the designated data piece from the second memory to the first memory in response to a requirement for cancel of pseudo erasure.

An eleventh aspect of this invention is based on the ninth aspect thereof, and provides a selective call receiver further comprising fifth means for erasing the designated data piece in the second memory in response to a requirement for actual erasure.

A twelfth aspect of this invention is based on the ninth aspect thereof, and provides a selective call receiver further comprising fifth means for erasing the designated data piece in the second memory when a predetermined interval of time elapses since a moment of removing the designated data piece from the first memory to the second memory.

DESCRIPTION OF THE PREFERRED EMBODIMENTS

First Embodiment

Figure 1:
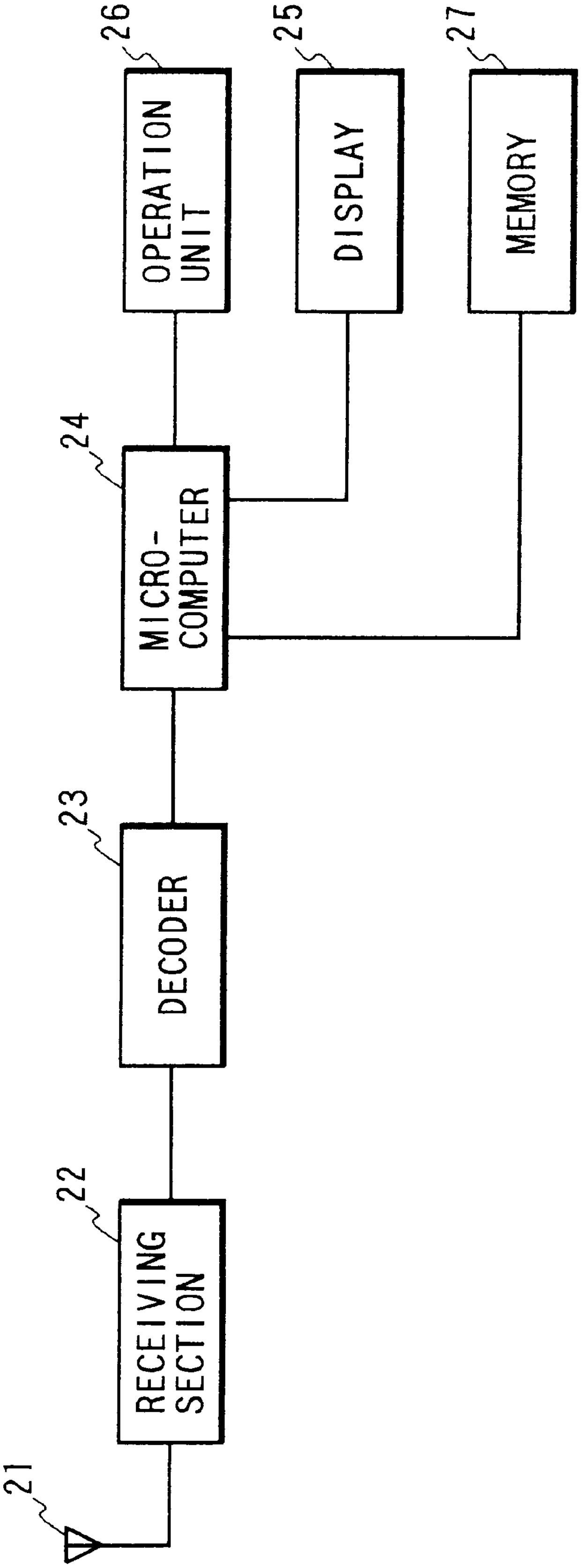
FIG. 1 is a block diagram of a radio selective call receiver according to a first embodiment of this invention.

With reference to FIG. 1, a radio selective call receiver (a radio message receiver or a radio paging receiver) includes an antenna 21 followed by a receiving section 22. The antenna 21 serves to catch a radio wave signal transmitted from, for example, a base station. Normally, the radio wave signal includes a paging signal. The paging signal represents an identification (ID) code word and a message. A radio wave signal caught by the antenna 21 is fed to the receiving section 22. The receiving section 22 demodulates the radio wave signal into a corresponding baseband signal.

A decoder 23 following the receiving section 22 receives the baseband signal therefrom, and decodes the baseband signal into corresponding data.

The decoder 23 is connected to a microcomputer 24 having a combination of an I/O port (an interface), a CPU, a RAM, and a ROM. The microcomputer 24 may be replaced by a microprocessor, a DSP, or another similar device. The microcomputer 24 receives the data from the decoder 23. The microcomputer 24 recovers the identification code word from the received data. The microcomputer 24 is connected to a display 25, an operation unit 26, and a memory 27. The microcomputer 24 operates in accordance with a program stored in the internal ROM.

The radio selective call receiver of FIG. 1 has a previously-assigned identification code word (a predetermined identification code word) stored in the ROM within the microcomputer 24. The predetermined identification code word may be stored in a ROM outside the microcomputer 24.

According to the program, the microcomputer 24 compares the recovered identification code word with the predetermined identification code word. When the recovered identification code word agrees with the predetermined identification code word, the microcomputer 24 recovers a data piece of the message from the received data. Then, the microcomputer 24 stores the data piece of the message into the memory 27. Accordingly, each time a paging signal addressed to the radio selective call receiver of FIG. 1 is successfully received, a data piece of a message represented by the paging signal is stored into the memory 27. In this case, if the memory 27 is fully occupied, an oldest data piece is erased from the memory 27 and the current data piece is written into the memory 27 therefor.

On the other hand, when the recovered identification code word disagrees with the predetermined identification code word, the microcomputer 24 discards the received data. Accordingly, in this case, a data piece of the message is neither recovered from the received data nor stored into the memory 27.

Figure 2:
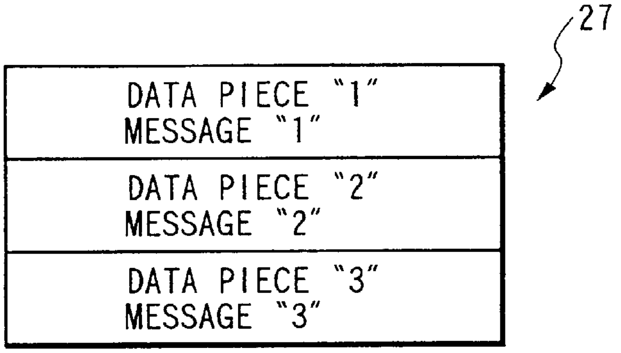
FIGS. 2, 3, and 4 are diagrams of a recording area of a memory in FIG. 1.

FIG. 2 shows an example of the recording-area structure of the memory 27. With reference to FIG. 2, the recording area of the memory 27 is divided into three segments each for a data piece of a message. For example, the three segments store a data piece "1" of a message "1", a data piece "2" of a message "2", and a data piece "3" of a message "3", respectively.

Various commands can be inputted into the microcomputer 24 from the operation unit 26 as a user actuates the operation unit 26. The commands include a command to indicate messages, a command to implement pseudo erasure of a designated message or designated messages, a command to cancel pseudo erasure of a message or messages, and a command to implement actual erasure of a designated message or designated messages.

In connection with the message indicating command, the microcomputer 24 is programmed to execute the following processes. Upon the reception of the message indicating command from the operation unit 26, the microcomputer 24 reads out data pieces of messages from the memory 27. Then, the microcomputer 24 feeds the data pieces of the messages to the display 25, and controls the display 25 so that the messages are indicated on the display 25.

Figure 5:
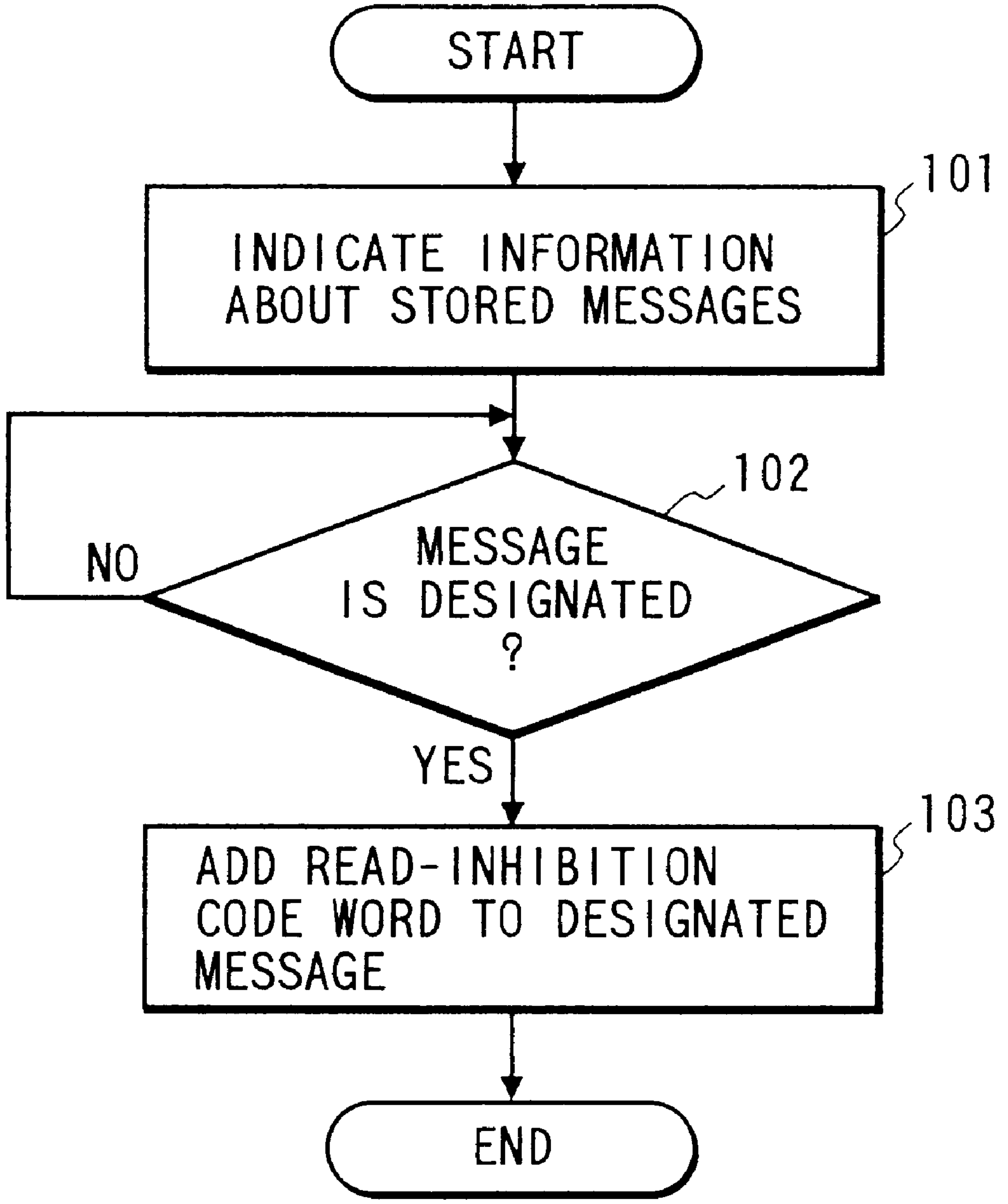
FIG. 5 is a flowchart of a first segment of a program for controlling a microcomputer in FIG. 1.

As previously explained, the microcomputer 24 operates in accordance with a program stored in the internal ROM. FIG. 5 is a flowchart of a segment of the program which is started when the microcomputer 24 receives the pseudo erasure command from the operation unit 26.

With reference to FIG. 5, a first step 101 of the program segment feeds the display 25 with information about messages represented by data pieces stored in the memory 27. The step 101 controls the display 25 to indicate the information about the stored messages. Generally, the user monitors the indication of the information about the stored messages, and actuates the operation unit 26 to designate or select a message or messages from among them as an object to be exposed to pseudo erasure. After the step 101, the program advances to a step 102.

The step 102 decides whether or not a message (or messages) has been selected (designated) from among the messages represented by the data pieces stored in the memory 27. When a message (or messages) has been designated, the program advances from the step 102 to a step 103. Otherwise, the step 102 is repeated.

The step 103 adds a predetermined code word (a predetermined signal) to a head of each data piece representing the designated message. As will be made clear later, the predetermined code word serves to inhibit the related data piece from being read out from the memory 27. Thus, a data piece having the predetermined code word undergoes pseudo erasure. The predetermined code word is also referred to as the read-inhibition code word. It is preferable that the predetermined code word, that is, the read-inhibition code word, denotes a predetermined character, for example, a character "x". After the step 103, the current execution cycle of the program segment ends.

Figure 6:
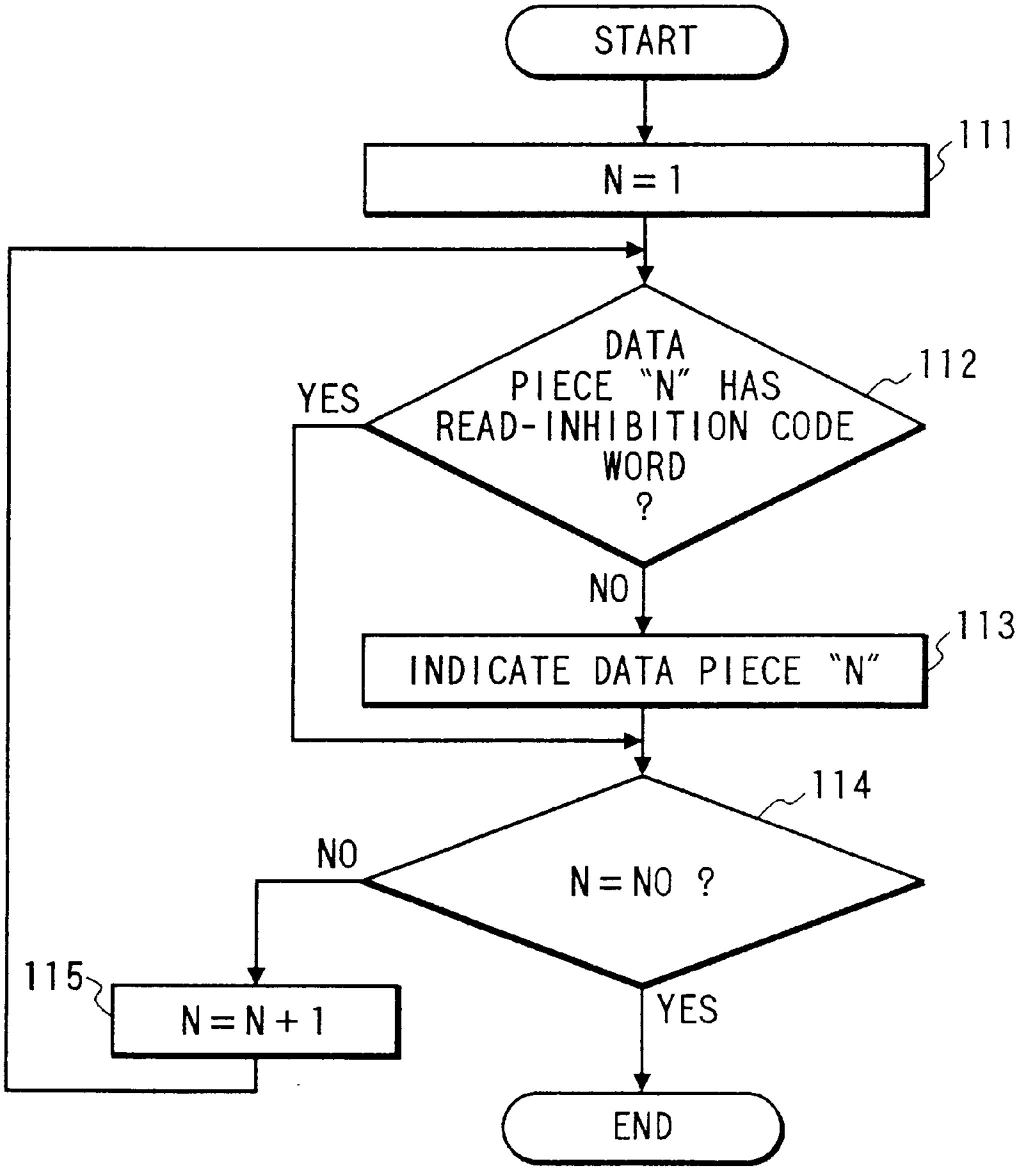
FIG. 6 is a flowchart of a second segment of the program for controlling the microcomputer in FIG. 1.

FIG. 6 is a flowchart of a segment of the program which is started when the microcomputer 24 receives the message indicating command from the operation unit 26.

With reference to FIG. 6, a first step 111 of the program segment initializes the variable "N" to "1". After the step 111, the program advances to a step 112.

The step 112 accesses the data piece "N" in the memory 27, and decides whether or not the data piece "N" has the read-inhibition code word. When the data piece "N" does not have the read-inhibition code word, the program advances from the step 112 to a step 113. On the other hand, the data piece "N" has the read-inhibition code word, the program jumps from the step 112 to a step 114.

The step 113 feeds the data piece "N" from the memory 27 to the display 25, and controls the display 25 so that the message "N" represented by the data piece "N" will be indicated on the display 25. After the step 113, the program advances to the step 114.

The step 114 decides whether or not the value N reaches a predetermined natural number NO. The predetermined natural number NO is equal to the maximum number of data pieces of messages which can be stored in the memory 27. When the value N reaches the predetermined natural number NO, the program exits from the step 114 and then the current execution cycle of the program segment ends. Otherwise, the program advances from the step 114 to a step 115.

The step 115 increments the value N by "1". After the step 115, the program returns to the step 112.

As understood from the above explanation, a data piece or data pieces without the read-inhibition code word can be fed from the memory 27 to the display 25, and a message or messages represented by the data piece or data pieces can be indicated on the display 25. On the other hand, a data piece or data pieces with the read-inhibition code word are inhibited from being read out from the memory 27. Thus, a data piece or data pieces with the read-inhibition code word are inhibited from traveling from the memory 27 to the display 25, and a message or messages represented by the data piece or data pieces are prevented from being indicated on the display 25.

Figure 7:
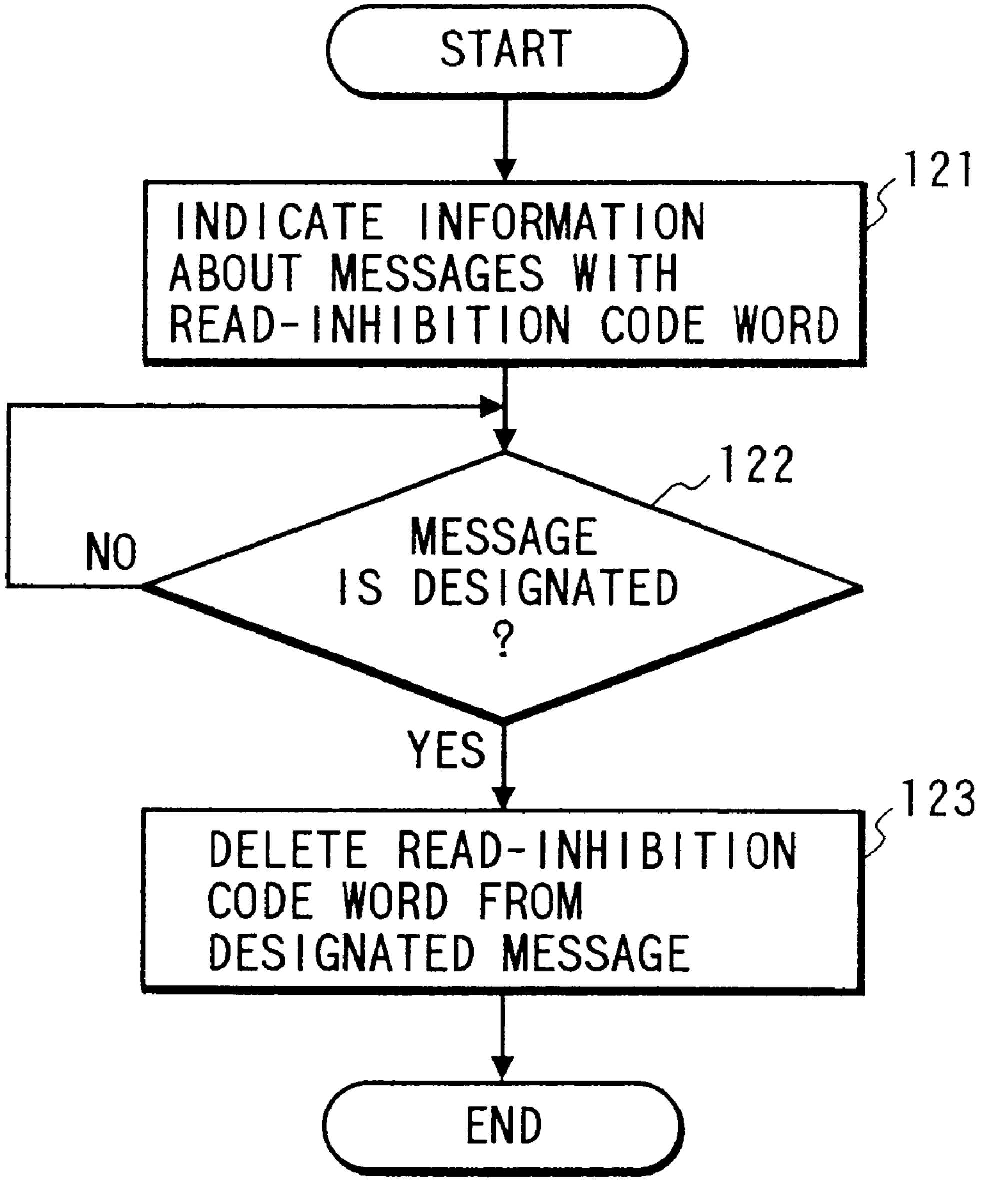
FIG. 7 is a flowchart of a third segment of the program for controlling the microcomputer in FIG. 1.

FIG. 7 is a flowchart of a segment of the program which is started when the microcomputer 24 receives the pseudo-erasure cancel command from the operation unit 26.

With reference to FIG. 7, a first step 121 of the program segment feeds the display 25 with information about a message or messages represented by a data piece or data pieces which have the read-inhibition code word and which are stored in the memory 27. The step 121 controls the display 25 to indicate the information about the message or messages with the read-inhibition code word. Generally, the user monitors the indication of the information about the message or messages with the read-inhibition code word, and actuates the operation unit 26 to designate or select a message or messages from thereamong as an object to be exposed to cancel of pseudo erasure. After the step 121, the program advances to a step 122.

The step 122 decides whether or not a message (or messages) has been selected (designated) from among the message (or messages) with the read-inhibition code word. When a message (or messages) has been designated, the program advances from the step 122 to a step 123. Otherwise, the step 122 is repeated.

The step 123 deletes the read-inhibition code word from each data piece representing the designated message. The message represented by the data piece from which the read-inhibition code word has been deleted can be indicated on the display 25. In this way, the pseudo erasure of the message or messages is canceled. After the step 123, the current execution cycle of the program segment ends.

Figure 8:
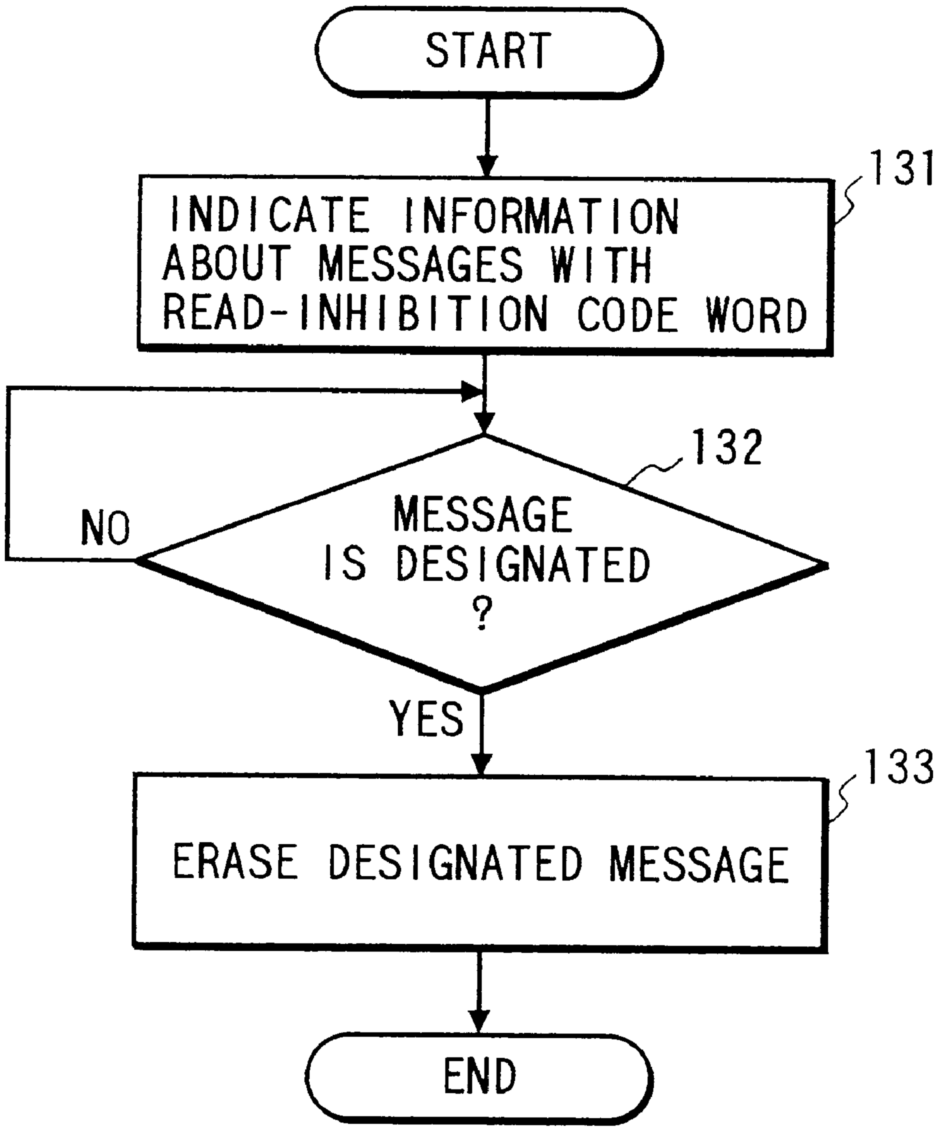
FIG. 8 is a flowchart of a fourth segment of the program for controlling the microcomputer in FIG. 1.

FIG. 8 is a flowchart of a segment of the program which is started when the microcomputer 24 receives the actual erasure command from the operation unit 26.

With reference to FIG. 8, a first step 131 of the program segment feeds the display 25 with information about a message or messages represented by a data piece or data pieces which have the read-inhibition code word and which are stored in the memory 27. The step 131 controls the display 25 to indicate the information about the message or messages with the read-inhibition code word. Generally, the user monitors the indication of the information about the message or messages with the read-inhibition code word, and actuates the operation unit 26 to designate or select a message or messages from thereamong as an object to be exposed to actual erasion. After the step 131, the program advances to a step 132.

The step 132 decides whether or not a message (or messages) has been selected (designated) from among the message (or messages) with the read-inhibition code word. When a message (or messages) has been designated, the program advances from the step 132 to a step 133. Otherwise, the step 132 is repeated.

The step 133 erases each data piece, which represents the designated message, from the memory 27. After the step 133, the current execution cycle of the program segment ends.

Figure 9:
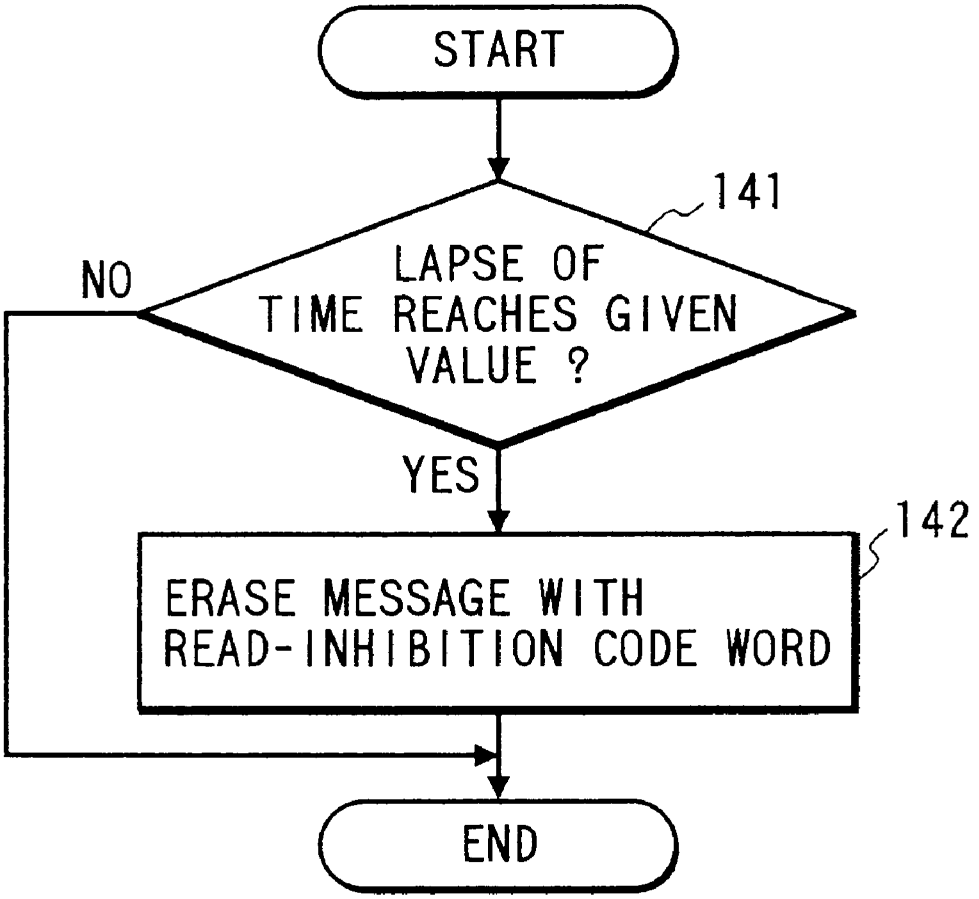
FIG. 9 is a flowchart of a fifth segment of the program for controlling the microcomputer in FIG. 1.

FIG. 9 is a flowchart of a segment of the program which is periodically executed according to a timer-based interruption process.

With reference to FIG. 9, a first step 141 executes a decision as to an oldest data piece among data pieces which have the read-inhibition code word and which are stored in the memory 27.

Specifically, the first step 141 of the program segment decides whether or not the lapse of time since the moment of the addition of the read-inhibition code word to the oldest data piece is longer than a predetermined interval of time. When the lapse of time is longer than the predetermined interval of time, the program advances from the step 141 to a step 142. Otherwise, the program exits from the step 141 and then the current execution cycle of the program segment ends.

The step 142 erases the oldest data piece of a message from the memory 27. After the step 142, the current execution cycle of the program segment ends.

When the user has noticed that a message is erroneously exposed to pseudo-erasure, the user actuates the operation unit 26 to input the pseudo-erasure cancel command to the microcomputer 24. As previously explained, the microcomputer 24 cancels the pseudo erasure of the message in question in response to the pseudo-erasure cancel command. Consequently, the message in question can be indicated on the display 27. Thus, the pseudo erasure implemented by the microcomputer 24 is effective to prevent a message from being actually erased by mistake.

Figure 3:
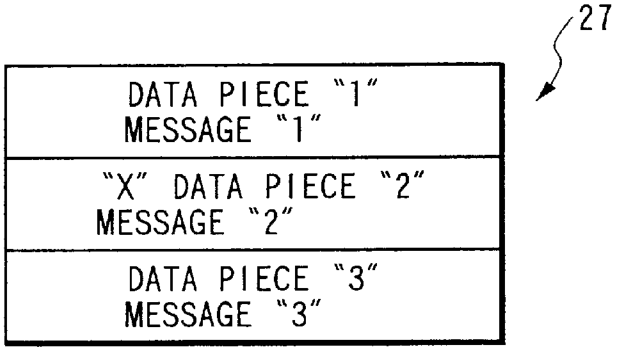
Figure 4:
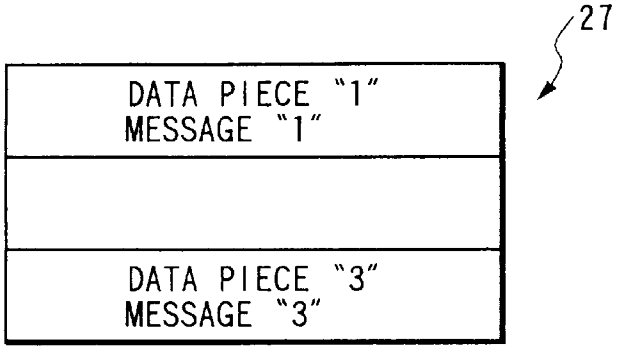

It is assumed that as shown in FIG. 2, the three segments of the recording area of the memory 27 store a data piece "1" of a message "1", a data piece "2" of a message "2", and a data piece "3" of a message "3", respectively. When the user inputs the pseudo erasure command into the microcomputer 24 by actuating the operation unit 26, the microcomputer 24 starts the process of the pseudo erasure. During the process of the pseudo erasion, the user actuates the operation unit 26 and thereby designates a message to be exposed to the pseudo erasure. The microcomputer 24 adds the read-inhibition code word (for example, the code word of the character "x") to the data piece of the designated message. As shown in FIG. 3, for example, the data piece "2" is designated, and the code word of the character "x" is added thereto. During a subsequent stage, when the user inputs the actual erasure command into the microcomputer 24 by actuating the operation unit 26, the microcomputer 24 erases the data piece with the read-inhibition code word (for example, the data piece "2") from the memory 27 in response to user's requirement as shown in FIG. 4.

Second Embodiment

Figure 10:
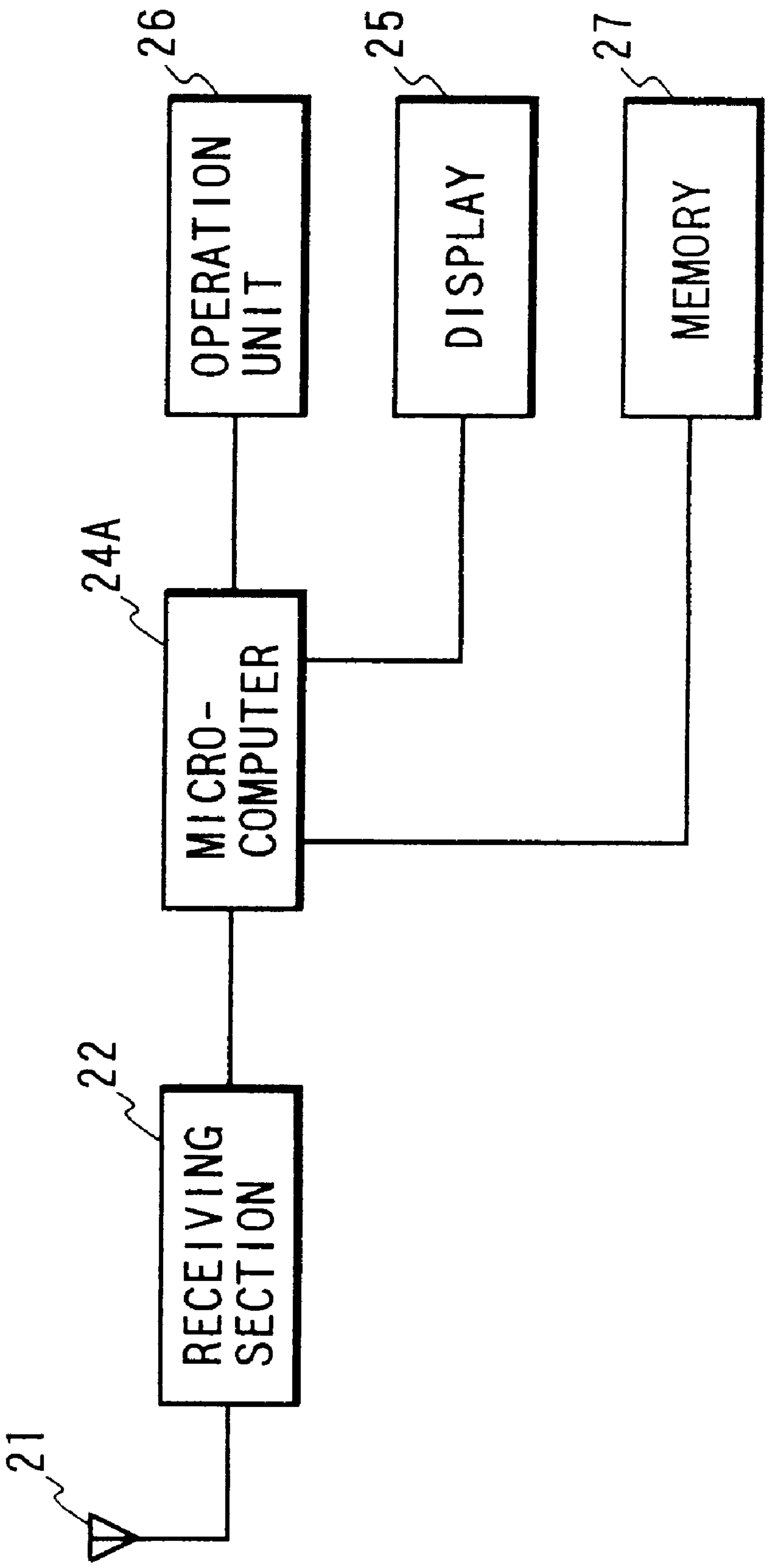
FIG. 10 is a block diagram of a radio selective call receiver according to a second embodiment of this invention.

FIG. 10 shows a second embodiment of this invention which is similar to the embodiment of FIGS. 1–9 except that a microcomputer 24A replaces the microcomputer 24 in FIG. 1, and that the decoder 23 (see FIG. 1) is omitted. In the embodiment of FIG. 10, the microcomputer 24A is directly connected to the receiving section 22.

The microcomputer 24A receives the baseband signal from the receiving section 22. The microcomputer 24A is programmed to decode the baseband signal into corresponding data. Thus, the microcomputer 24A implements the function provided by the decoder 23 (see FIG. 1).

Third Embodiment

Figure 11:
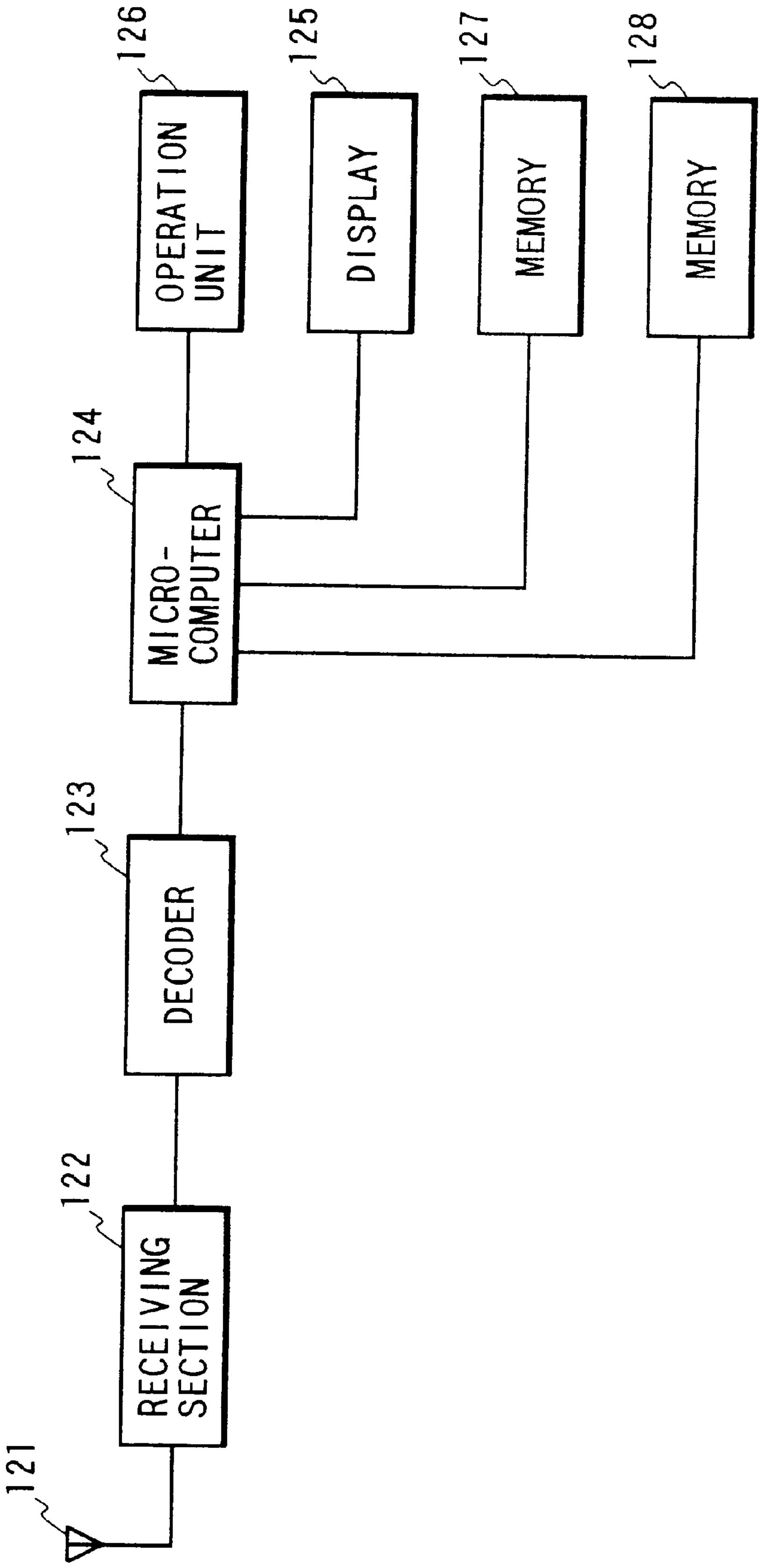
FIG. 11 is a block diagram of a radio selective call receiver according to a third embodiment of this invention.

With reference to FIG. 11, a radio selective call receiver (a radio message receiver or a radio paging receiver) includes an antenna 121 followed by a receiving section 122. The antenna 121 serves to catch a radio wave signal transmitted from, for example, a base station. Normally, the radio wave signal includes a paging signal. The paging signal represents an identification (ID) code word and a message. A radio wave signal caught by the antenna 121 is fed to the receiving section 122. The receiving section 122 demodulates the radio wave signal into a corresponding baseband signal.

A decoder 123 following the receiving section 122 receives the baseband signal therefrom, and decodes the baseband signal into corresponding data.

The decoder 123 is connected to a microcomputer 124 having a combination of an I/O port (an interface), a CPU, a RAM, and a ROM. The microcomputer 124 may be replaced by a microprocessor, a DSP, or another similar device. The microcomputer 124 receives the data from the decoder 123. The microcomputer 124 recovers the identification code word from the received data. The microcomputer 124 is connected to a display 125, an operation unit 126, and memories 127 and 128. The microcomputer 124 operates in accordance with a program stored in the internal ROM.

The radio selective call receiver of FIG. 11 has a previously-assigned identification code word (a predetermined identification code word) stored in the ROM within the microcomputer 124. The predetermined identification code word may be stored in a ROM outside the microcomputer 124.

According to the program, the microcomputer 124 compares the recovered identification code word with the predetermined identification code word. When the recovered identification code word agrees with the predetermined identification code word, the microcomputer 124 recovers a data piece of the message from the received data. Then, the microcomputer 124 stores the data piece of the message into the memory 127. Accordingly, each time a paging signal addressed to the radio selective call receiver of FIG. 11 is successfully received, a data piece of a message represented by the paging signal is stored into the memory 127. In this case, if the memory 127 is fully occupied, an oldest data piece is erased from the memory 127 and the current data piece is written into the memory 127 therefor.

On the other hand, when the recovered identification code word disagrees with the predetermined identification code word, the microcomputer 124 discards the received data. Accordingly, in this case, a data piece of the message is neither recovered from the received data nor stored into the memory 127.

Figure 12:
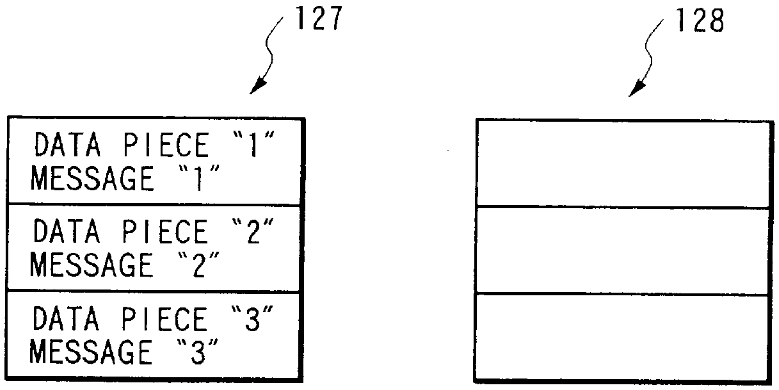
FIGS. 12, 13, and 14 are diagrams of recording areas of memories in FIG. 11.

FIG. 12 shows an example of the recording-area structures of the memories 127 and 128. With reference to FIG. 12, the recording area of each of the memories 127 and 128 is divided into three segments each for a data piece of a message. For example, the three segments in the recording area of the memory 127 store a data piece "1" of a message "1", a data piece "2" of a message "2", and a data piece "3" of a message "3", respectively.

Various commands can be inputted into the microcomputer 124 from the operation unit 126 as a user actuates the operation unit 126. The commands include a command to indicate messages, a command to implement pseudo erasure of a designated message or designated messages, a command to cancel pseudo erasure of a message or messages, and a command to implement actual erasure of a designated message or designated messages.

In connection with the message indicating command, the microcomputer 124 is programmed to execute the following processes. Upon the reception of the message indicating command from the operation unit 126, the microcomputer 124 reads out data pieces of messages from the memory 127. Then, the microcomputer 124 feeds the data pieces of the messages to the display 125, and controls the display 125 so that the messages are indicated on the display 125.

Figure 15:
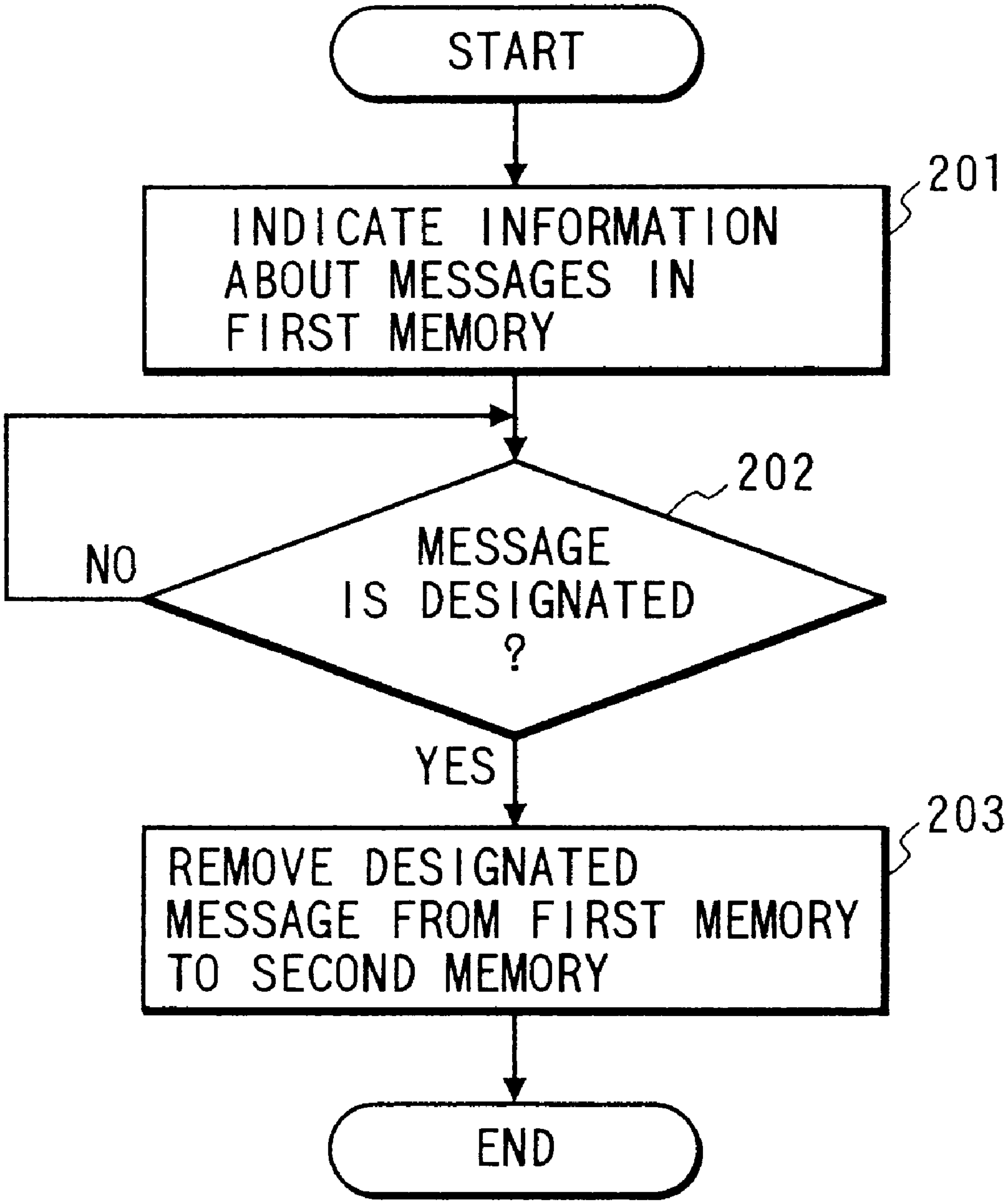
FIG. 15 is a flowchart of a first segment of a program for controlling a microcomputer in FIG. 11.

As previously explained, the microcomputer 124 operates in accordance with a program stored in the internal ROM. FIG. 15 is a flowchart of a segment of the program which is started when the microcomputer 124 receives the pseudo erasure command from the operation unit 126.

With reference to FIG. 15, a first step 201 of the program segment feeds the display 125 with information about messages represented by data pieces stored in the memory 127. The step 201 controls the display 125 to indicate the information about the stored messages. Generally, the user monitors the indication of the information about the stored messages, and actuates the operation unit 26 to designate or select a message or messages from among them as an object to be exposed to pseudo erasure. After the step 201, the program advances to a step 202.

The step 202 decides whether or not a message (or messages) has been selected (designated) from among the messages represented by the data pieces stored in the memory 127. When a message (or messages) has been designated, the program advances from the step 202 to a step 203. Otherwise, the step 202 is repeated.

The step 203 transfers or removes each data piece, which represents the designated message, from the memory 127 to the memory 128. Thus, the data piece of the designated message is erased from the memory 127, and is saved in the memory 128. In this way, the data piece of the designated message undergoes pseudo erasure. As will be made clear later, the removal of the data piece of the designated message from the memory 127 inhibits the designated message from being indicated on the display 127. After the step 203, the current execution cycle of the program segment ends.

Figure 16:
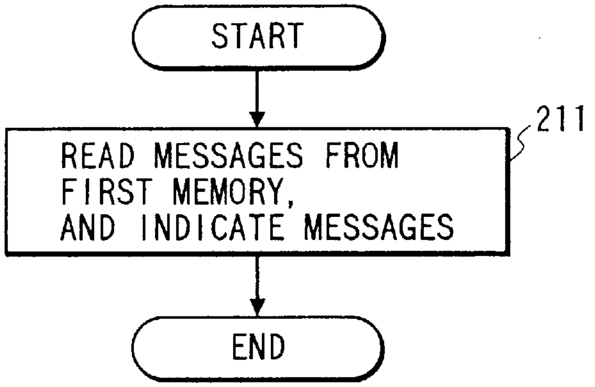
FIG. 16 is a flowchart of a second segment of the program for controlling the microcomputer in FIG. 11.

FIG. 16 is a flowchart of a segment of the program which is started when the microcomputer 124 receives the message indicating command from the operation unit 126.

With reference to FIG. 16, a step 211 of the program segment reads out data pieces of messages from the memory 127, and feeds the data pieces of the messages to the display 125. The step 211 controls the display 125 so that the messages represented by the data pieces will be indicated on the display 125. After the step 211, the current execution cycle of the program segment ends. A data piece or data pieces in the memory 128 are not accessed by the step 211, so that a message or messages represented by the data piece or data pieces are prevented from being indicated on the display 125.

As understood from the above explanation, a data piece or data pieces in the memory 127 can be fed to the display 125, and a message or messages represented by the data piece or data pieces can be indicated on the display 125. On the other hand, a data piece or data pieces in the memory 128 are inhibited from traveling to the display 125, and a message or messages represented by the data piece or data pieces are prevented from being indicated on the display 125.

Figure 17:
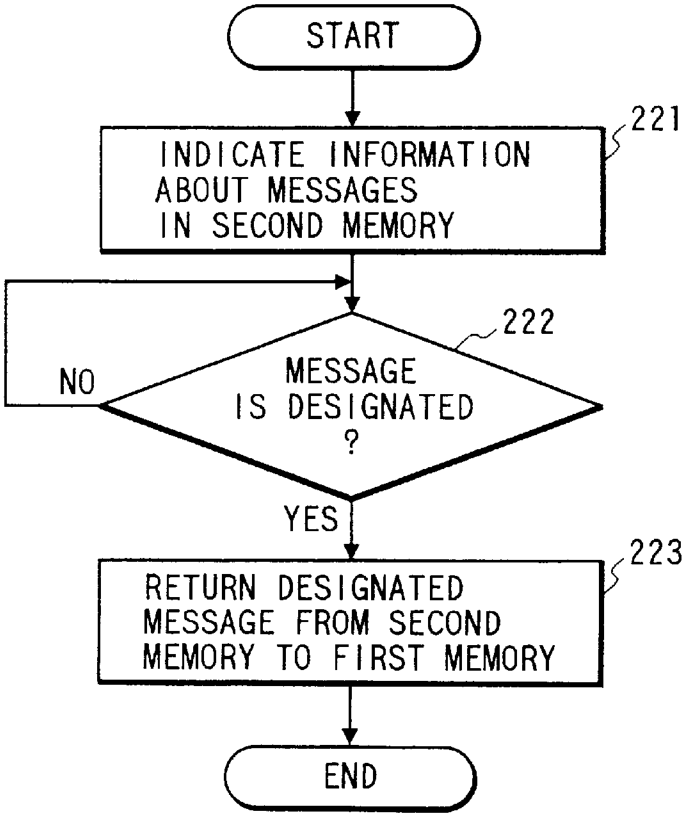
FIG. 17 is a flowchart of a third segment of the program for controlling the microcomputer in FIG. 11.

FIG. 17 is a flowchart of a segment of the program which is started when the microcomputer 124 receives the pseudo-erasure cancel command from the operation unit 126.

With reference to FIG. 17, a first step 221 of the program segment feeds the display 125 with information about a pseudo-erasure message or messages represented by a data piece or data pieces which are stored in the memory 128. The step 221 controls the display 125 to indicate the information about the pseudo-erasion message or messages. Generally, the user monitors the indication of the information about the pseudo-erasure message or messages, and actuates the operation unit 126 to designate or select a message or messages from thereamong as an object to be exposed to cancel of pseudo erasure. After the step 221, the program advances to a step 222.

The step 222 decides whether or not a message (or message) has been selected (designated) from among the pseudo-erasure message (or messages). When a message (or messages) has been designated, the program advances from the step 222 to a step 223. Otherwise, the step 222 is repeated.

The step 223 returns each data piece, which represents the designated message, from the memory 128 to the memory 127. The message represented by the data piece which has been returned to the memory 127 can be indicated on the display 125. In this way, the pseudo erasure of the message or messages is canceled. After the step 223, the current execution cycle of the program segment ends.

Figure 18:
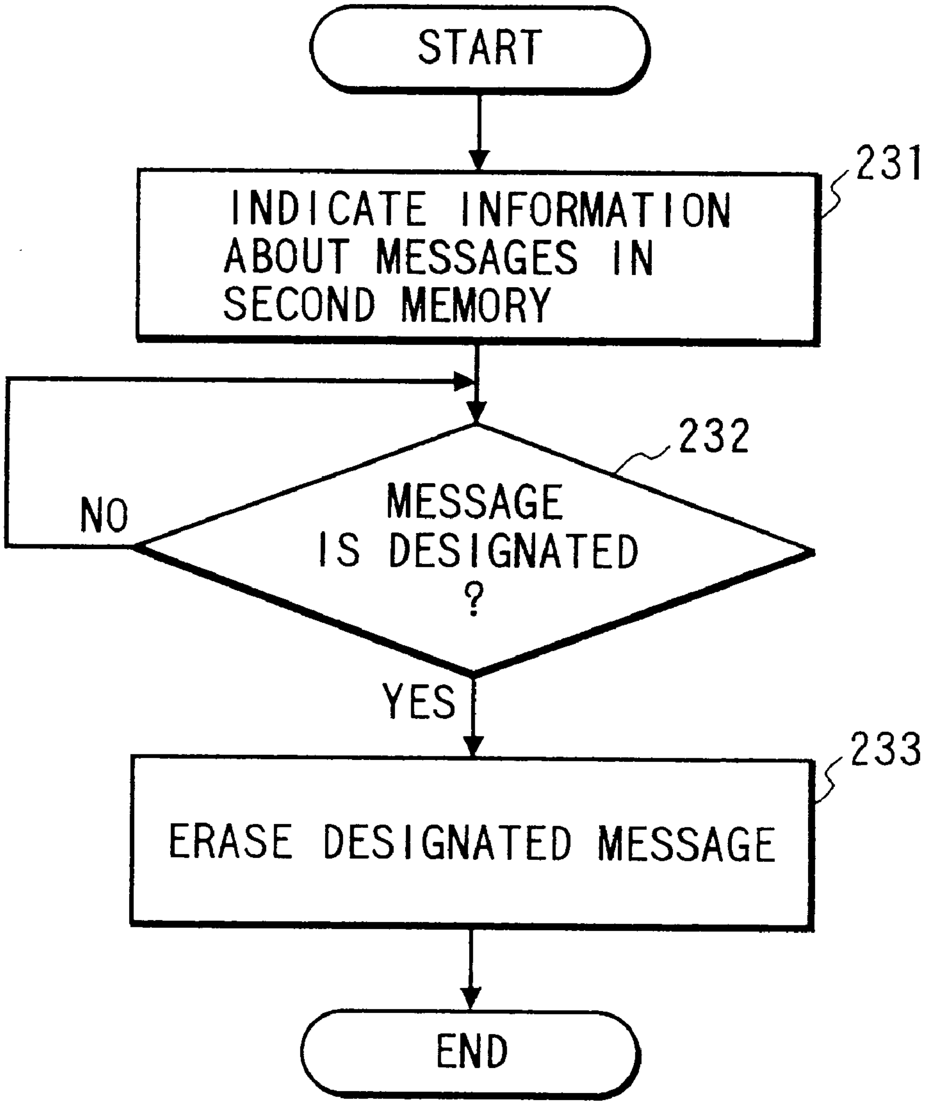
FIG. 18 is a flowchart of a fourth segment of the program for controlling the microcomputer in FIG. 11.

FIG. 18 is a flowchart of a segment of the program which is started when the microcomputer 124 receives the actual erasure command from the operation unit 126.

With reference to FIG. 18, a first step 231 of the program segment feeds the display 125 with information about a pseudo-erasion message or messages represented by a data piece or data pieces which are stored in the memory 128. The step 231 controls the display 125 to indicate the information about the pseudo-erasure message or messages. Generally, the user monitors the indication of the information about the pseudo-erasure message or messages, and actuates the operation unit 126 to designate or select a message or messages from thereamong as an object to be exposed to actual erasion. After the step 231, the program advances to a step 232.

The step 232 decides whether or not a message (or messages) has been selected (designated) from among the pseudo-erasure message (or messages). When a message (or messages) has been designated, the program advances from the step 232 to a step 233. Otherwise, the step 232 is repeated.

The step 233 erases each data piece, which represents the designated message, from the memory 128. After the step 233, the current execution cycle of the program segment ends.

Figure 19:
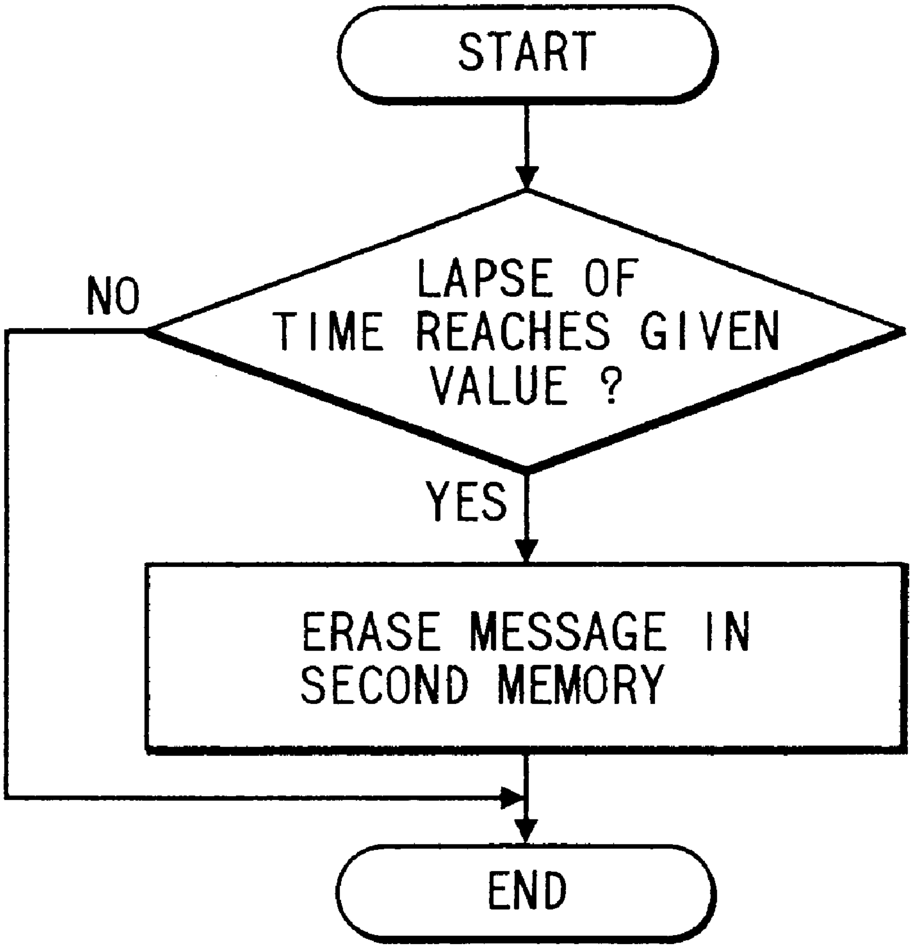
FIG. 19 is a flowchart of a fifth segment of the program for controlling the microcomputer in FIG. 11.

FIG. 19 is a flowchart of a segment of the program which is periodically executed according to a timer-based interruption process.

With reference to FIG. 19, a first step 241 of the program segment executes a decision about an oldest data piece in the memory 128. Specifically, the step 241 decides whether or not the lapse of time since the moment of the removal of the oldest data piece from the memory 127 to the memory 128 is longer than a predetermined interval of time. When the lapse of time is longer than the predetermined interval of time, the program advances from the step 241 to a step 242. Otherwise, the program exits from the step 241 and then the current execution cycle of the program segment ends.

The step 242 erases the oldest data piece of a message from the memory 128. After the step 242, the current execution cycle of the program segment ends.

When the user has noticed that a message is erroneously exposed to pseudo erasure, the user actuates the operation unit 126 to input the pseudo-erasure cancel command to the microcomputer 124. As previously explained, the microcomputer 124 cancels the pseudo erasure of the message in question in response to the pseudo-erasure cancel command. Consequently, the message in question can be indicated on the display 127. Thus, the pseudo erasure implemented by the microcomputer 124 is effective to prevent a message from being actually erased by mistake.

Figure 13:
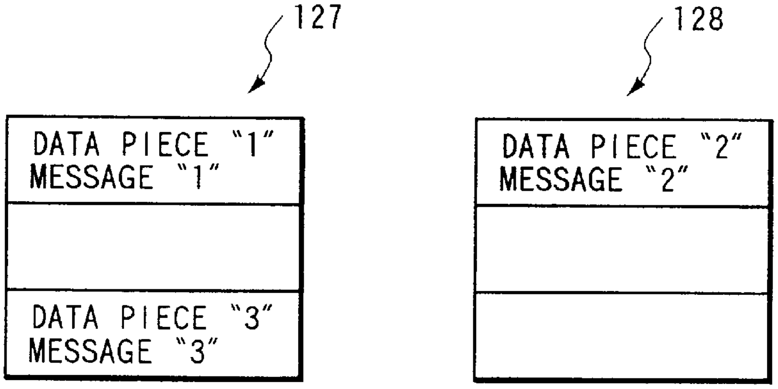
Figure 14:
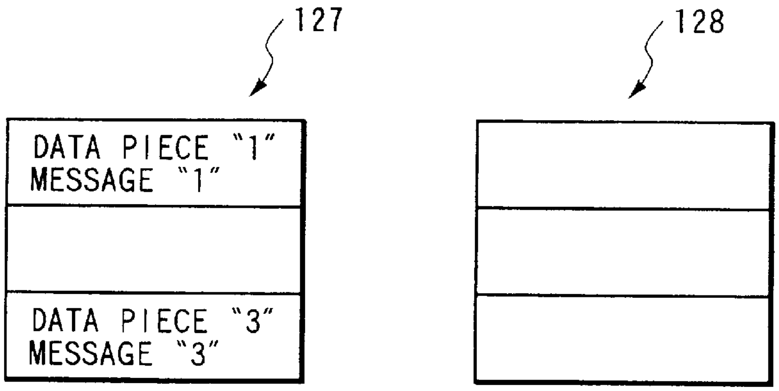

It is assumed that as shown in FIG. 12, the three segments of the recording area of the memory 127 store a data piece “1” of a message “1”, a data piece “2” of a message “2”, and a data piece "3" of a message "3", respectively. When the user inputs the pseudo erasure command into the microcomputer 124 by actuating the operation unit 126, the microcomputer 124 starts the process of the pseudo erasure. During the process of the pseudo erasion, the user actuates the operation unit 126 and thereby designates a message to be exposed to the pseudo erasure. The microcomputer 124 removes the data piece of the designated message from the memory 127 to the memory 128. As shown in FIG. 13, for example, the data piece "2" is designated, and the data piece "2" is removed from the memory 127 to the memory 128. During a subsequent stage, when the user inputs the actual erasion command into the microcomputer 124 by actuating the operation unit 126, the microcomputer 124 erases a data piece (for example, the data piece "2") from the memory 128 in response to user's requirement as shown in FIG. 14.

It should be noted that the memories 127 and 128 may be formed by a common memory.

Fourth Embodiment

Figure 20:
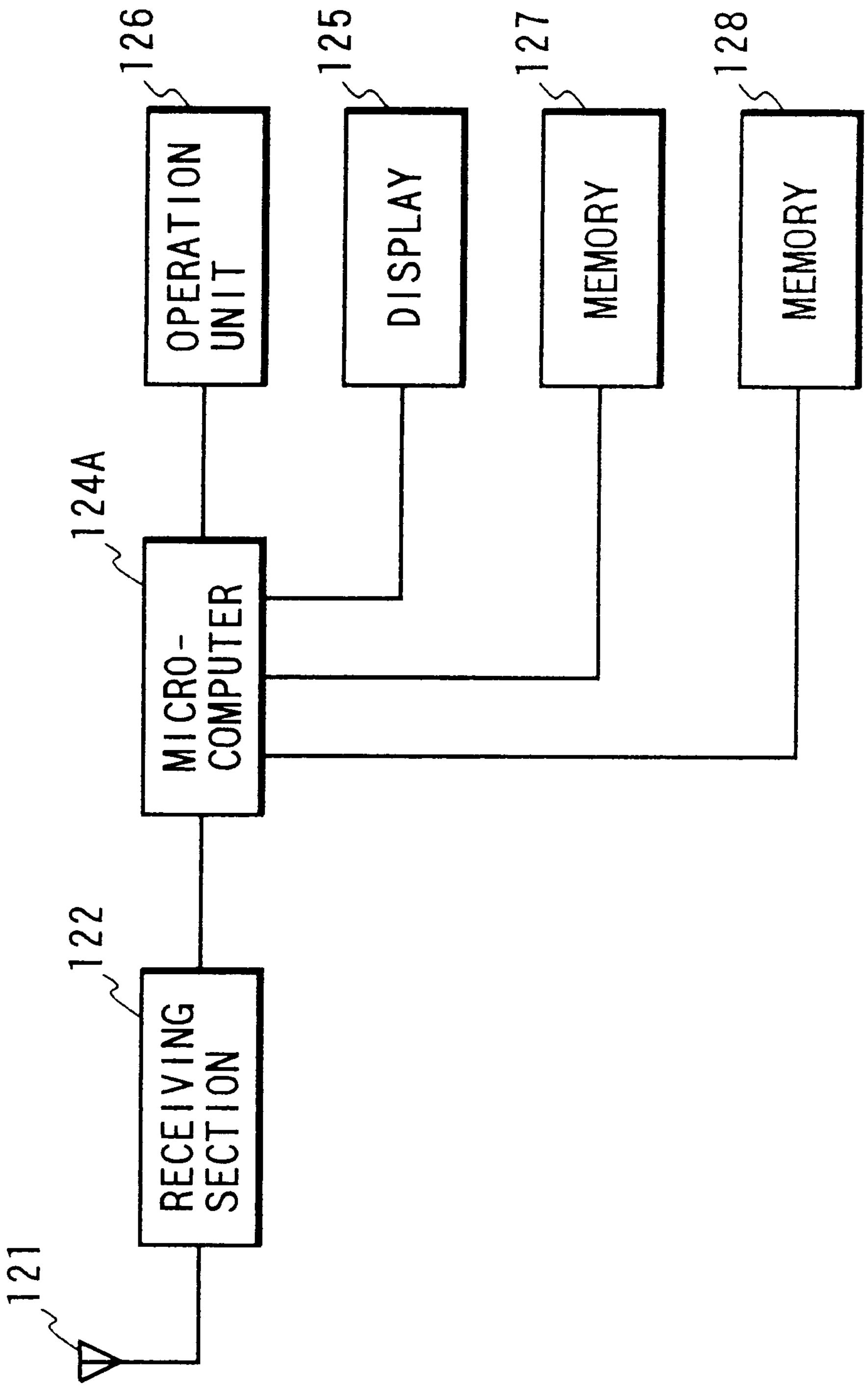
FIG. 20 is a block diagram of a radio selective call receiver according to a fourth embodiment of this invention.

FIG. 20 shows a fourth embodiment of this invention which is similar to the embodiment of FIGS. 11–19 except that a microcomputer 124A replaces the microcomputer 124 in FIG. 11, and that the decoder 123 (see FIG. 11) is omitted. In the embodiment of FIG. 20, the microcomputer 124A is directly connected to the receiving section 122.

The microcomputer 124A receives the baseband signal from the receiving section 122. The microcomputer 124A is programmed to decode the baseband signal into corresponding data. Thus, the microcomputer 124A implements the function provided by the decoder 123 (see FIG. 1).

What is claimed is:

1. A selective call receiver comprising:

a memory for storing data pieces;

first means for arbitrarily designating, in response to a user's requirement, a data piece from among the data pieces in the memory as an object to be exposed to pseudo erasure;

second means for adding a predetermined read-inhibition code word to the data piece designated by the first means;

third means for inhibiting the designated data piece with the predetermined read-inhibition code word from being read out and displayed from the memory;

fourth means for allowing a data piece without the predetermined read-inhibition code word to be read out from the memory;

fifth means for deleting the predetermined read-inhibition code word from the designated data piece in response to a user's requirement for cancellation of pseudo erasure; and sixth means for selectively erasing only the designated data piece with the predetermined read-inhibition code word in the memory in response to a user's requirement for actual erasure.

2. A selective call receiver as recited in claim 1, wherein the predetermined read-inhibition code word represents a character "X".

* * * * *